GAIN STABILIZED DIFFERENTIAL AMPLIFIER

Filed Jan. 5, 1967 3 Sheets-Sheet 1

INVENTOR.
DAVID M. STERN
BY Joseph P. Kates
ATTORNEY

GAIN STABILIZED DIFFERENTIAL AMPLIFIER

Filed Jan. 5, 1967 3 Sheets-Sheet 2

INVENTOR.
DAVID M. STERN
BY Joseph P. Kates
ATTORNEY

Oct. 14, 1969 D. M. STERN 3,473,137

GAIN STABILIZED DIFFERENTIAL AMPLIFIER

Filed Jan. 5, 1967 3 Sheets-Sheet 3

INVENTOR.
DAVID M. STERN
BY Joseph P. Kates
ATTORNEY

United States Patent Office 3,473,137
Patented Oct. 14, 1969

3,473,137

GAIN STABILIZED DIFFERENTIAL AMPLIFIER

David M. Stern, Merion Station, Pa., assignor to Burroughs Corporation, Detroit, Mich., a corporation of Michigan Filed Jan. 5, 1967, Ser. No. 607,560
Int. Cl. H03f 3/68
U.S. Cl. 330—30 15 Claims

ABSTRACT OF THE DISCLOSURE

A differential amplifier having a first and a second PNP transistor each of which receives input signals applied to its base, a third PNP transistor directly coupled by its collector being connected through a first resistor to the emitter of the first transistor in cascode-like connection and a fourth PNP transistor directly coupled by its collector being connected through a second resistor to the emitter of the second transistor in cascode-like connection. The emitters of the third and fourth transistors are connected together and to a constant current source. D.C. (direct current) inverse feedback is coupled from the first and second transistor collectors to the third and fourth transistor bases respectively via a first and a second Zener diode.

A resistor and a capacitor are connected between the first and second transistor emitters and provide an A.C. (alternating current) positive feedback path. An emitter follower buffer amplifier output means is coupled to the collector of one of the second stages of the differential amplifier. An embodiment which minimizes the effects of memory write transients includes a source of input pulses timed to be presented at the beginning of the write cycle and resistor-diode circuits connected at the amplifier signal input points.

BACKGROUND OF THE INVENTION

Field of the invention

The present invention relates to a differential amplifier and more particularly relates to a differential amplifier circuit adapted to receive low level differential A.C. signals and provide an amplified output with stabilized gain. The invention is useful for sensing and amplifying signals in applications such as computer and/or character reading. For example, the invention may be used for sensing and amplifying signals from memory devices such as from inductors of heads when reading from a magnetic drum or tape which inductors are connected in a manner to provide two input signals which are 180° out of phase (enabling minimizations of noise transients which would not appear as 180° out of phase input signals). The invention may also be used in applications involving sensing and reading from output windings of cores of a memory. In applications where writing is also performed the invention enables more rapid recovery from writing overload transients.

Description of the published art

Examples of differential amplifiers include that of U.S. Patent No. 3,153,203 of C. W. Sem-Jacobsen et al. for Transistorized Symmetrical Differential Alternating Current Amplifier issued Oct. 15, 1964; U.S. Patent No. 3,144,564 of D. J. Sikorra for Cascaded Differential Amplifiers With Positive and Negative Feedback issued Aug. 11, 1964; U.S. Patent No. 3,080,528 of J. J. Davidson for Transistor Amplifier Circuits Utilizing A Zener Diode for Stabilization issued Mar. 5, 1963; U.S. Patent No. 2,941,155 of P. G. Lucas for Differential Amplifier, issued June 14, 1960. Others include that of U.S. Patent No. 3,208,000 of E. G. Stromer for Stabilized Amplifiers, issued Sept. 21, 1965; U.S. Patent No. 3,182,269 of D. R. Smith for Differential Amplifier Bias Circuit, issued May 4, 1965; and U.S. Patent No. 3,168,708 of R. Stuart-Williams et al. for Differential Amplifier Circuits for Magnetic Memory Sensing issued Feb. 2, 1965. However such circuits unless made very complex possess disadvantages in that gain is sensitive to the drift in parameters of individual transistor components, they do not provide for gain depending essentially upon the ratio of passive elements, they do not provide the better structural and functional relationship which the differing structure of the present invention permits, and they are not as feasible to use with sense amplifier logic as is the invention.

For example, the Sem-Jacobsen et al. device utilizes the feedback inherently provided in the emitter resistors of the differential amplifier stages and is more dependent than is the present invention upon the variations in parameters of the individual amplifier transistors. The Sem-Jacobsen et al. circuit requires transistors which have more than ten times the transconductance attainable by present day transistors for stable operation comparable with the invention. The invention is structurally different from the Stuart-Williams et al. device. The structural differences cause the Stuart-Williams et al. device to have a less effective differential action. The Smith and Stromer devices are similar to each other. The Stromer device is not similar to applicant's in structure and is not a differential amplifier. The Smith device is a much more complicated device than applicant's. Applicant's device also is considerably different structurally from that of Lucas. Lucas presents some structure which at first glance appears similar to the instant invention in that he shows two sets of gain elements wherein pairs are connected in cascode-like connection. However, he does not show the positive and negative feedback paths which applicant employs in order to obtain gain independent of drifts in parameters of active elements. The Davidson amplifier is not a differential amplifier. There are no divided paths as in applicant's device and therefore no opportunity for a common mode rejection and differential gain. The Sikorra configuration requires two types of transistors, NPN and PNP, in the single circuit and he has a complex group of feedbacks not involving the emitter circuits. His circuit differs substantially from applicant's structure. He requires many more components and more complex structure.

The circuit of this invention possesses inherent advantages over any of the prior art functionally similar circuits in that, with approximately balanced element pairs, the gain is held stable over a wide range of reasonable transistor parameter values and drift. It is subject only to requirements as that the collector resistors of the input transistors be at values of approximately 1,000 ohms or greater and that each pair of the transistors be reasonably balanced.

SUMMARY OF THE INVENTION

The invention is directed to a differential amplifier comprising a pair of input and a pair of succeeding stages wherein negative feedback is provided from the input stages to stages succeeding each of the input stages by feeding back both A.C. and D.C. in a direction to reduce gain (negative feedback) in order to stabilize the gain; at the same time a positive A.C. feedback is provided between the terminals of the input stages which enhances the A.C. gain thus providing stabilized gain dependent upon the values of the feedback components and essentially independent of the characteristics of the individual active elements (transistors). The invention provides a gain stabilized amplifier which because of its differential circuit characteristics eliminates noise, also wherein the gain is stabilized independently of the parameter drift of indivdual active elements, and wherein the gain may be determined essentially by the ratio of a first to a second resistor. The invention also provides circuitry whereby the sensitivity to overload write transients is reduced by replacing the write transient at the amplifier input points by a controlled generated artificial common mode signal. The present invention solves problems due to and overcomes the above-enumerated and other disadvantages of the prior art and provides advantages over prior art circuits in that it provides an improved means of obtaining the desirable characteristic of a stabilized gain for a differential amplifier, and moreover, it provides an amplifier gain which is stabilized with readily obtainable restrictions on the active elements utilized, and depends essentially only upon the ratio of passive elements comprising two resistors. The inventive circuit eliminates much of the variation in gain caused by drift in transistor parameters. Additionally, the present invention presents advantages over the prior art in that it makes provision of more optimum strobing circuits feasible for memory sensing applications because cutting down the amount of variables involved enables a better sampling technique to be accomplished by the strobing circuits. Good system stability is critical for good strobing circuit design.

Accordingly an object of the present invention is to provide an improved stabilized gain differential amplifier which will provide the optimum gain output required for applications such as computer applications wherein sensing from a memory device is to occur, which will do away with need for great stability selectivity in components in fabricating the circuit, the gain of which will be determined by the values of passive components, and which will provide an output such as to facilitate more optimum design of strobing circuits in connection with equipment used along with sense amplifier logic.

Another object of the invention is the provision of a transient eliminating feature whereby, when a large write transient is presented at the inputs of the amplifier, there is simultaneously generated an appropriate signal in a direction to minimize the effects on the amplifier of this transient input voltage.

While the novel and distinctive features of the invention are particularly pointed out in the appended claims, a more expository treatment of the invention in principle and in detail is afforded and the foregoing and other objects and advantages of this invention will best be understood by reference to the following description of an embodiment of the invention taken in conjunction with the accompanying drawings wherein:

DESCRIPTION OF THE FIRST PREFERRED EMBODIMENT

Figure 1:
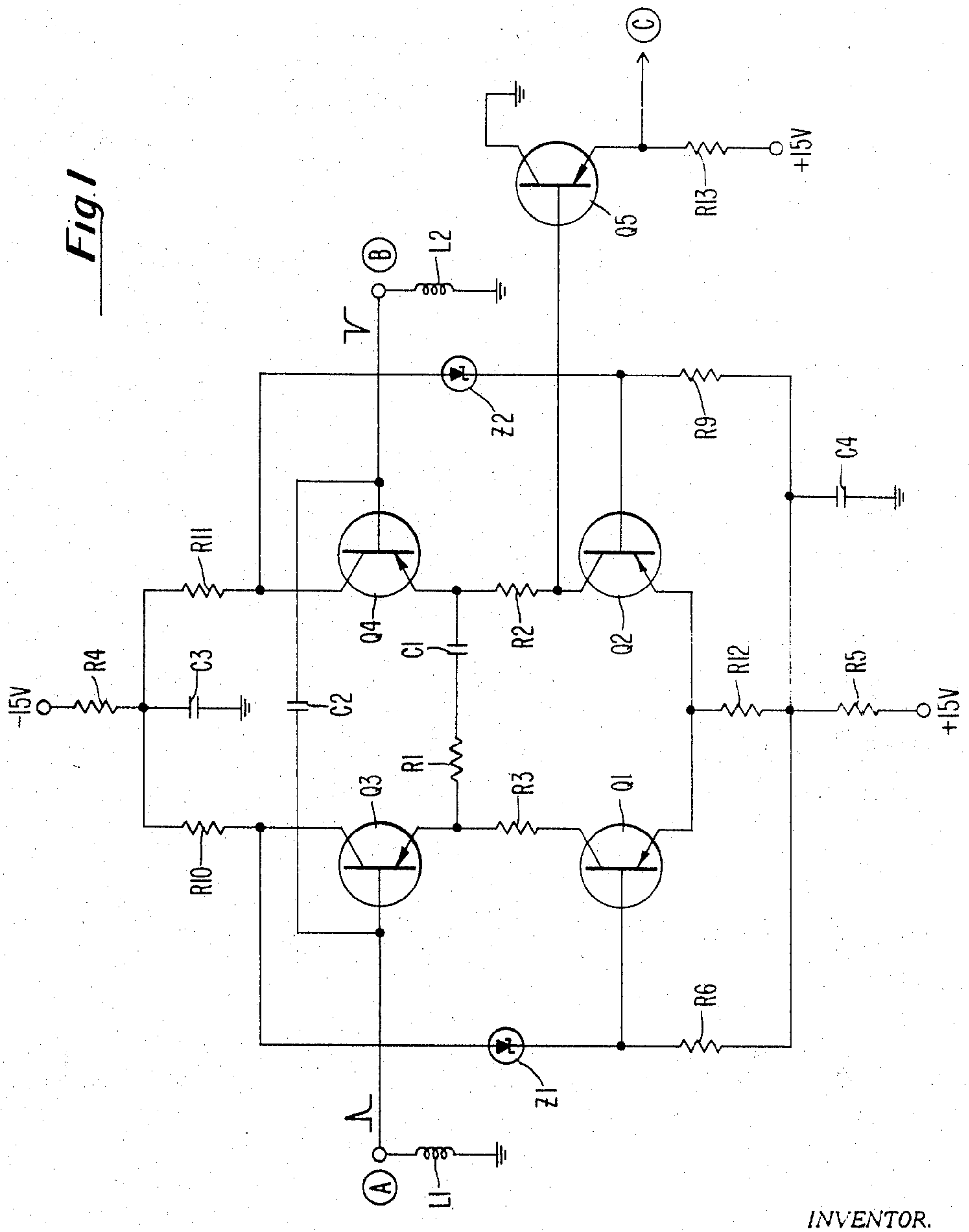
FIG. 1 is a schematic representation of the circuit of a first preferred embodiment of the gain stabilized differential amplifier of the invention suitable for read operations.

Now refer to FIG. 1. A first pair of signal input receiving PNP input stage transistors Q3 and Q4 each having a base, and emitter and a collector are provided. A power supply voltage source and decoupling network comprising a −15 volts source, a resistor R4 and a decoupling capacitor C3 is provided. One end of resistor R4 is connected to one end of capacitor C3; resistor R4 and capacitor C3 being connected in series. The negative fifteen volt (−15 v.) source is connected to the end of resistor R4 opposite its capacitor connected end. The end of the capacitor C3 opposite its resistor R4 connected end is grounded. A transistor Q3 collector resistor R10 and a transistor Q4 collector resistor R11 are provided. The collector resistor R10 is connected between the collector of transistor Q3 and the junction between the resistor R4 and capacitor C3. The collector resistor R11 is connected between the collector of transistor Q4 and the junction between resistor R4 and decoupling capacitor C3. A second pair of PNP output stage transistors Q1 and Q2 are provided. Transistors Q1 and Q3 are connected in cascode-like connection. Transistors Q2 and Q4 are also connected in cascode-like connection. Connected in cascode-like connection means herein that the emitter of the input stage transistor is directly coupled to the collector of the output stage transistor. A first and a second coupling resistor R3 and R2 are provided and directly couple the respective input stages Q3 and Q4 to the respective output stages Q1 and Q2. That is, resistor R3 is connected between the emitter of transistor Q3 and the collector of transistor Q1 and resistor R2 is connected between the emitter of transistor Q4 and the collector of transistor Q2. A resistor R1 and a capacitor C1 are provided and connected in series between the emitters of transistors Q3 and Q4 to provide for A.C. feedback in a manner to be described. That is, one end of resistor R1 is connected to the emitter of transistor Q3 and one end of capacitor C1 is connected to the emitter of transistor Q4. At their other ends resistor R1 is connected to capacitor C1. A second power supply voltage source and decoupling circuit comprising a positive 15 volt (+15 v.) source, a resistor R5, and a decoupling capacitor C4 is provided. An emitter resistor R12 is provided to furnish essentially constant current to the pair of emitters of transistors Q1 and Q2. Resistor R12 is connected at one end to the emitters of transistors Q1 and Q2. The emitters of transistors Q1 and Q2 are connected to each other. Decoupling capacitor C4 is connected to ground at one end. At its ungrounded end capaitor C4 is onneted to the end of resistor R5 opposite its +15 v. source connected end. The end of resistor R12 opposite its transistor Q1 and Q2 emitter connected end is connected to the junction between resistor R5 and capacitor C4. A pair of Zener diodes Z1 and Z2 are provided. The anode of Zener diode Z1 is connected to the collector of transistor Q3. The cathode of Zener diode Z1 is connected to the base of transistor Q1. The anode of Zener diode Z2 is connected to the collector of transistor Q4. The cathode of Zener diode Z2 is connected to the base of transistor Q2. A large resistor R6 is provided and connected between the base of transistor Q1 and the junction between resistors R12 and R5. Another large resistor R9 is provided and connected between the base of transistor Q2 and the junction between resistors R12 and R5. Zener diode Z1 and resistor R6 together form a first voltage level shifting circuit to establish a proper operating point at the base of transistor Q1. Zener diode Z2 and resistor R9 together form a similar second voltage level shifting circuit to establish the proper operating point at the base of transistor Q2.

Sources of signal input, for example, memory sensing devices represented by inductors L1 and L2, are provided and introduce input signals along input leads (not numbered) into the bases of respective transistors Q3 and Q4. The inductors L1 and L2 may be output windings of magnetic cores or may be the windings of magnetic heads which detect magnetic signals in reading output from a magnetic drum, disk or tape.

A small capacitor C2 is provided. Capacitor C2 is connected between the bases of transistors Q3 and Q4 to attenuate or suppress high frequency noise and parasitic oscillations. A buffer amplifier comprising a transistor Q5 and an emitter resistor R13 are provided. The base of transistor Q5 is connected to the collector of transistor Q2 to receive output therefrom for isolation. A positive power supply voltage source of +15 volts, which may be the same +15 volt source as that connected to one end of resistor R5, is provided and presents proper emitter voltage to transistor Q5. The collector of transistor Q5 is grounded. Output is taken from the emitter of transistor Q5 and may be coupled to following circuits through a capacitor (not shown). Transistor Q5 thereby acts as an emitter follower to provide isolation between the amplifying elements and the following circuits. It should be understood of course that without departing from the spirit and principles of the invention, transistors Q1, Q2, Q3, Q4 and Q5 might be NPN transistors with appropriate changes in the circuit voltages and Zener diode connections.

The junction between inductor L1 and the base of transistor Q3 is designated point A and the junction between inductor L2 and the base of transistor Q4 is designated point B, points A and B being the signal input source points.

The voltage provided at the base of transistors Q1 and Q2 determines which fraction of the total current provided by resistor R12 is conducted by each of these transistors. The emitters of transistors Q3 and Q4 reside essentially at ground potential when the signal sources have low D.C. impedance (inductors L1 and L2) and are referenced (connected) to ground. It will be assumed that signal sources L1 and L2 are so connected that when point B goes negative, point A goes relatively positive and vice versa.

OPERATION

When a negative signal is applied at point B, transistor Q4 attempts to conduct more current. This attempt is reflected in the collector of transistor Q4 which collector becomes less negative (or positive-going). This positive-going voltage is coupled through Zener diode Z2 and is reflected at the base of transistor Q2 where the positive-going voltage tends to reduce the amount of current that transistor Q2 is conducting. This causes the emitter of transistor Q4 to be more negative tending to reduce or nullify the effect of the input signal at point B (because the transistor Q4 emitter voltage has tended to follow the input signal at the transistor Q4 base). This is the action of the negative feedback which stabilizes the amplifier in general and in particular the D.C. gain. That is, upon applying an input signal, this circuit tends to cancel the effect at the transistor Q4 emitter due to the applied input signal. The same action occurs on the left half of the amplifier (transistor Q3 circuit) as has been described for the right side. Similar negative feedback occurs for positive-going applied input signals as well as for negative-going applied input signals.

When the negative transition at point B is sufficiently rapid so that its effect may be coupled through capacitor C1 then the effects of the negative feedback applied to the emitter of transistor Q4 is attenuated and a greater voltage change is attained at the collector of transistor Q4. The attenuation of the negative feedback signal at the emitter of transistor Q4 is accompanied by attenuation of the opposite phased feedback signal at the emitter of transistor Q3 (by coupling through capacitor C1 and resistor R1). The positive signal applied to the base of transistor Q3 results in a negative signal at its collector. Consequently, a negative signal is applied to the base of transistor Q1 via Zener diode Z1. This negative signal applied to the base of transistor Q1 coupled with the reduction in negative feedback at its emitter causes transistor Q1 to receive a larger fraction of the current supplied to both transistors Q1 and Q2 by resistor R12. The constant current source effect provided by resistor R12 tends to insure that the current changes in transistors Q1 and Q2 are equal and opposite, for with a constant current in resistor R12 a current increase through transistor Q1 must be coupled with a corresponding decrease in current through transistor Q2.

As stated above, in normal operation a negative transition at input signal source point B is accompanied by a relatively positive transition at input signal source point A. The effect of the positive signal at point A is enhanced by the negative signal component coupled into the emitter of transistor Q3 by the positive feedback path through capacitor C1 and resistor R1. Thus, in this amplifier there are two conflicting tendencies, the negative feedback effects occasioned by the action of the Zener diode negative feedback paths into the bases of transistors Q1 and Q2 and the positive feedback effect occasioned by the feedback path across capacitor C1 and resistor R1. For this reason the actual resulting gain is very nearly given by the ratio of resistor R2 to resistor R1 since the output is taken at the transistor Q2 collector. If output were taken from the transistor Q1 collector then the gain would be the ratio of resistance of resistor R3 to resistor R1. It is assumed that the pairs of transistors Q1 and Q2 and the pair of transistors Q3 and Q4 are balanced.

Figure 2:
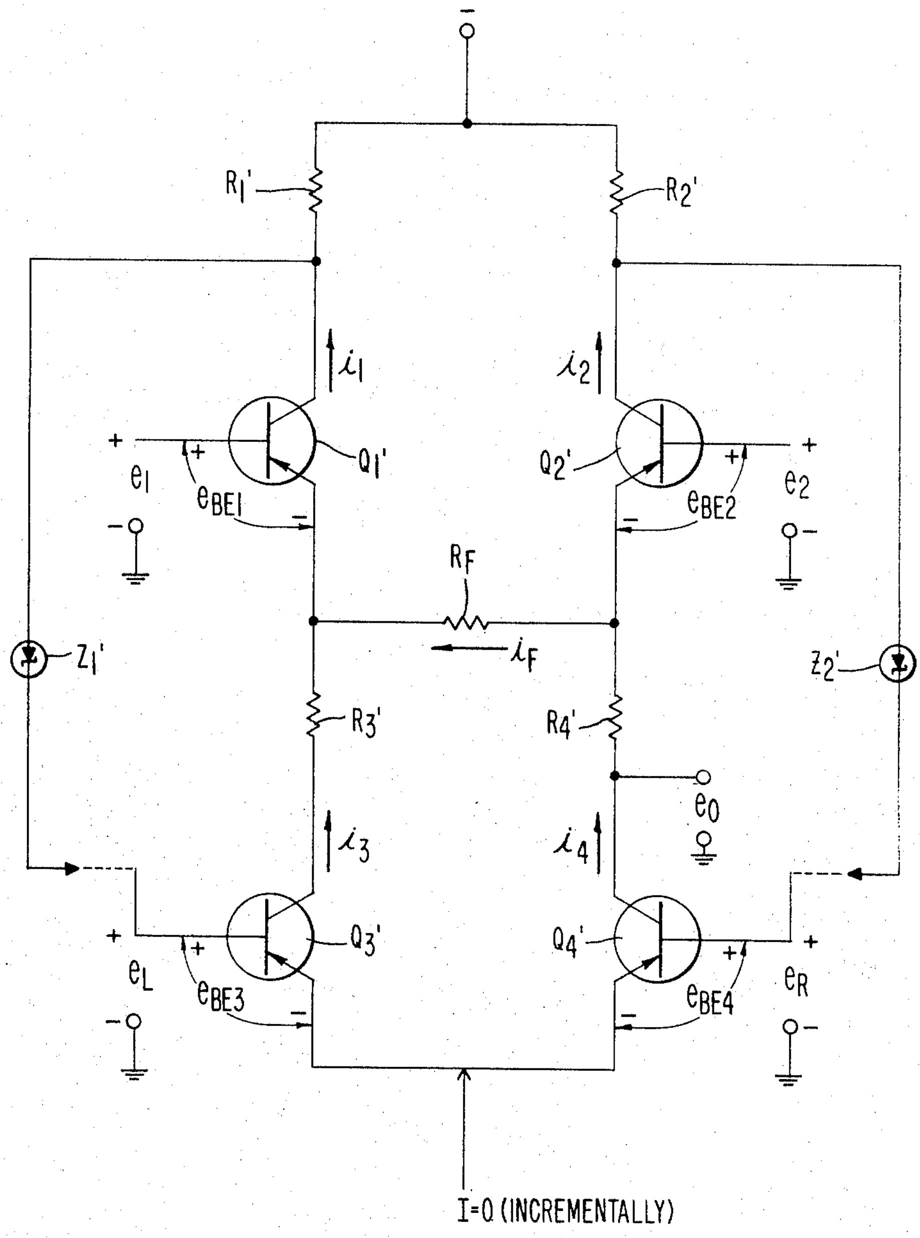
FIG. 2 is a schematic representation of the device of FIG. 1 showing parameters employed in a linear incremental analysis of the preferred embodiment of FIG. 1.

Refer to the FIG. 2 showing of the circuit components and signal parameters needed for a linear incremental analysis of the circuit of FIG. 1. The validity of the gain magnitude and of the gain stability assertions afforded by the invention is shown hereinbelow by the following linear, incremental analysis:

The parameters used in the analysis are defined as follows:

Where $\alpha$=current gain of transistor with collector and base short circuited (alpha)

I=current

G=transconductance

B=base

E=emitter

BE=base to emitter $I_E$=emitter current $e$=signal voltage $i$=current flow in circuit at a point.

| | Equations | Unknowns |
|---|---|---|
| 1, 2 | $I_{E1}=-G_1e_{BE1}, I_{E2}=-G_2e_{BE2}$ | $I_{E1}, I_{E2}, I_{E3}, I_{E4}$ |
| 3, 4 | $I_{E3}=-G_3e_{BE3}, I_{E4}=-G_4e_{BE4}$ | $e_{BE1}\ e_{BE2}\ e_{BE3}\ e_{BE4}$ |
| 5 | $e_1-e_2=(e_{BE1}-e_{BE2})-i_FR_F$ | |
| 6 | $I_{E1}=i_3+i_F$ | |
| 7 | $I_{E2}=i_4-i_F$ | $i_F$ |
| 8, 9 | $\alpha_1 I_{E1}=i_1, \alpha_2I_{E2}=i_2$ | $i_1, i_2, i_3, i_4$ |
| 10, 11 | $\alpha_3I_{E3}=i_3, \alpha_4I_{E4}=i_4$ | |
| 12, 13 | $e_L=\alpha_1R\,'I_{F1}, e_R=\alpha_2R_2'I_{E2}$ | $e_L, e_R$ |
| 14 | $I_{E3}+I_{E4}=0$ | |
| 15 | $e_L=e_{BE3}-e_{BE4}+e_R$ | (15 equations, 15 unknowns) |

The above equations may be reduced to:

$$\left(\frac{R_F}{\alpha_1}+\frac{1}{\alpha_1G_1}\right)\left\{\left[\frac{1}{\alpha_4G_4R_1'}+\frac{\alpha_3}{\alpha_3\alpha_4G_3R_1'}\right]i_4+\frac{R_2'}{R_1'}i_2\right\}=-\frac{\alpha_3R_F}{\alpha_4}i_4+e_2-e_1+\frac{1}{\alpha_2G_2}i_2 \quad \text{Eq. (1)}$$

$$i_2\left(\frac{R_F}{\alpha_2}+\frac{1}{\alpha_2G_2}\right)=R_Fi_4-\left(e_2-e_1\right)+\frac{1}{\alpha_1G_1}\left\{\left[\frac{1}{\alpha_4G_4R_1'}+\frac{\alpha_3}{\alpha_3\alpha_4G_3R_1'}\right]i_4+\frac{R_2'}{R_1'}i_2\right\} \quad \text{Eq. (2)}$$

from Eq. 1

$$\left[\left(\frac{R_F}{\alpha_1}+\frac{1}{\alpha_1G_1}\right)\left(\frac{1}{\alpha_4G_4R_1'}+\frac{1}{\alpha_4G_3R_1'}\right)+\frac{\alpha_3R_F}{\alpha_4}\right]i_4=(e_2-e_1)+\left[\frac{1}{\alpha_2G_2}-\frac{R_2'}{R_1'}\left(\frac{R_F}{\alpha_1}+\frac{1}{\alpha_1G_1}\right)\right]i_2 \quad \text{Eq. (3)}$$

from Eq. 2

$$\left[\frac{1}{\alpha_1G_1}\left(\frac{1}{\alpha_4G_4R_1}+\frac{1}{\alpha_4G_3R'}+R_F\right]i_4=(e_2-e_1)+\left[\frac{R_F}{\alpha_2}+\frac{1}{\alpha_2G_2}-\frac{R_2'}{R_1'\alpha_1G_1}\right]i_2 \quad \text{Eq. (4)}$$

Assume a balanced circuit:

$$R_1=R_2,\ \alpha_2G_2=\alpha_1G_1,\ G_3=G_4$$

from Eq. 3

$$\left[\left(\frac{R_F}{\alpha_1}+\frac{1}{\alpha_1G_1}\right)\left(\frac{2}{\alpha_4G_4R_1'}\right)+\frac{\alpha_3R_F}{\alpha_4}\right]i_4=(e_2-e_1)-\frac{R_F}{\alpha_1}i_2 \quad \text{Eq. (5)}$$

from Eq. 4

$$\left[\frac{1}{\alpha_1G_1}\left(\frac{2}{\alpha_4G_4R_1'}\right)+R_F\right]i_4=(e_2-e_1)+\frac{R_F}{\alpha_2}i_2 \quad \text{Eq. (6)}$$

$$i_2=\frac{\alpha_2}{R_F}\left[\frac{1}{\alpha_1G_1}\left(\frac{2}{\alpha_4G_4R_1'}\right)+R_F\right]i_4-(e_2-e_1)\frac{\alpha_2}{R_F}$$

$$i_2=\frac{\alpha_2}{R_F}\left\{\left[\frac{2}{\alpha_1\alpha_4G_1G_4R_1'}+R_F\right]i_4-(e_2-e_1)\right\}$$

$$i_2=\left[\frac{2\alpha_2}{\alpha_1\alpha_4G_1G_4R_1'R_F}+\alpha_2\right]i_4-(e_2-e_1)\frac{\alpha_2}{R_F} \quad \text{Eq. (7)}$$

Assume $R_1$ large enough, then from Eq. 7:

$$i_2=\alpha_2i_4-(e_2-e_1)\frac{\alpha_2}{R_F} \quad \text{Eq. (8)}$$

Substituting Eq. 8 into Eq. 5 and considering $R_1$ large enough:

$$\frac{\alpha_3}{\alpha_4}R_Fi_4=(e_2-e_1)-\frac{R_F}{\alpha_1}\left[\alpha_2i_4-(e_2-e_1)\frac{\alpha_2}{R_F}\right] \quad \text{Eq. (9)}$$

Regrouping terms:

$$i_4\left\{\frac{\alpha_3}{\alpha_4}R_F+\frac{\alpha_2}{\alpha_1}R_F\right\}=(e_2-e_1)\left[1+\frac{\alpha_2}{\alpha_1}\right] \quad \text{Eq. (10)}$$

Having assumed balance then also: $\alpha_3=\alpha_4$ $\alpha_2=\alpha_1$ from Eq. 10

$$2R_Fi_4=(e_2-e_1)(2) \quad \text{Eq. (11)}$$

$$i_4=\frac{(e_2-e_1)}{R_F} \quad \text{Eq. (12)}$$

Substantially:

$$e_0=(i_4R_4' \quad \text{Eq. (13)}$$

Hence:

$$e_0=(e_2-e_1)\frac{R_4'}{R_F} \quad \text{Eq. (14)}$$

Thus it is demonstrated that the gain depends only upon the ratio of $R_4/R_F$ and is essentially independent of other circuit parameters provided that $R_1'=1{,}000\Omega$ or more and balance is assumed and $R_F$ is at least 1Ω.

Implications of $R_1'$ large:

from Eq. 7 (1).

$$\frac{2}{\alpha_1\alpha_4G_4G_1R_F}\ll R_1'$$

from Eq. 5 (2).

$$\frac{2}{\alpha_1\alpha_4G_4}\ll R_1'$$

Accepting that $.95<\alpha<.97\rightarrow\alpha^2>.9$

Suppose $G_1=\frac{1}{4}\rightarrow G^2=\frac{1}{16}$ which is a conservative assumption $$\frac{2}{\frac{9}{10}\cdot\frac{1}{16}R_F}\ll R_1'$$

$$\frac{320}{9R_F}\ll R_1'$$

For $R_F=1\Omega$ $$\frac{320}{9}=35.5\ll R_1'$$

and $$\frac{2}{\frac{9}{10}\frac{1}{4}}\ll R_1'$$

$$\frac{80}{9}\ll R_1'$$

$$8.9\ll R_1'$$

Thus for the assumed topical values with $R_F$ at least as large as 1Ω; if $R_1'$ 1,000Ω; the above approximations of 1 and 2 hereinabove are well satisfied.

It is seen from FIG. 1 that D.C. operating point variations are greatly reduced by the large amount of negative feedback provided through the Zener diode coupling and by the current limiting provided by resistor R12. The full effect of the negative feedback is active in stabilizing the D.C. operating point since the positive feedback being capacity coupled has no effect on the D.C. operation of the circuit.

In the presence of A.C. signal input, occasioned by the output from the signal sources L1 and L2, the A.C. positive feedback path afforded by the capacitance of capacitor C1 and the resistance of resistor R1 permits the device to act as an amplifier to such A.C. voltage which affords desired amplification of the A.C. signal input. The output from the differential amplifier may be taken either from the collector of transistor Q1 or of transistor Q2 or for that matter from both collectors simultaneously. In this embodiment the output is taken from the collector of transistor Q2 and coupled directly into the base of an emitter follower Q5. Emitter follower Q5 is a buffer amplifier and provides output at its emitter at the point designated C.

Figure 3:
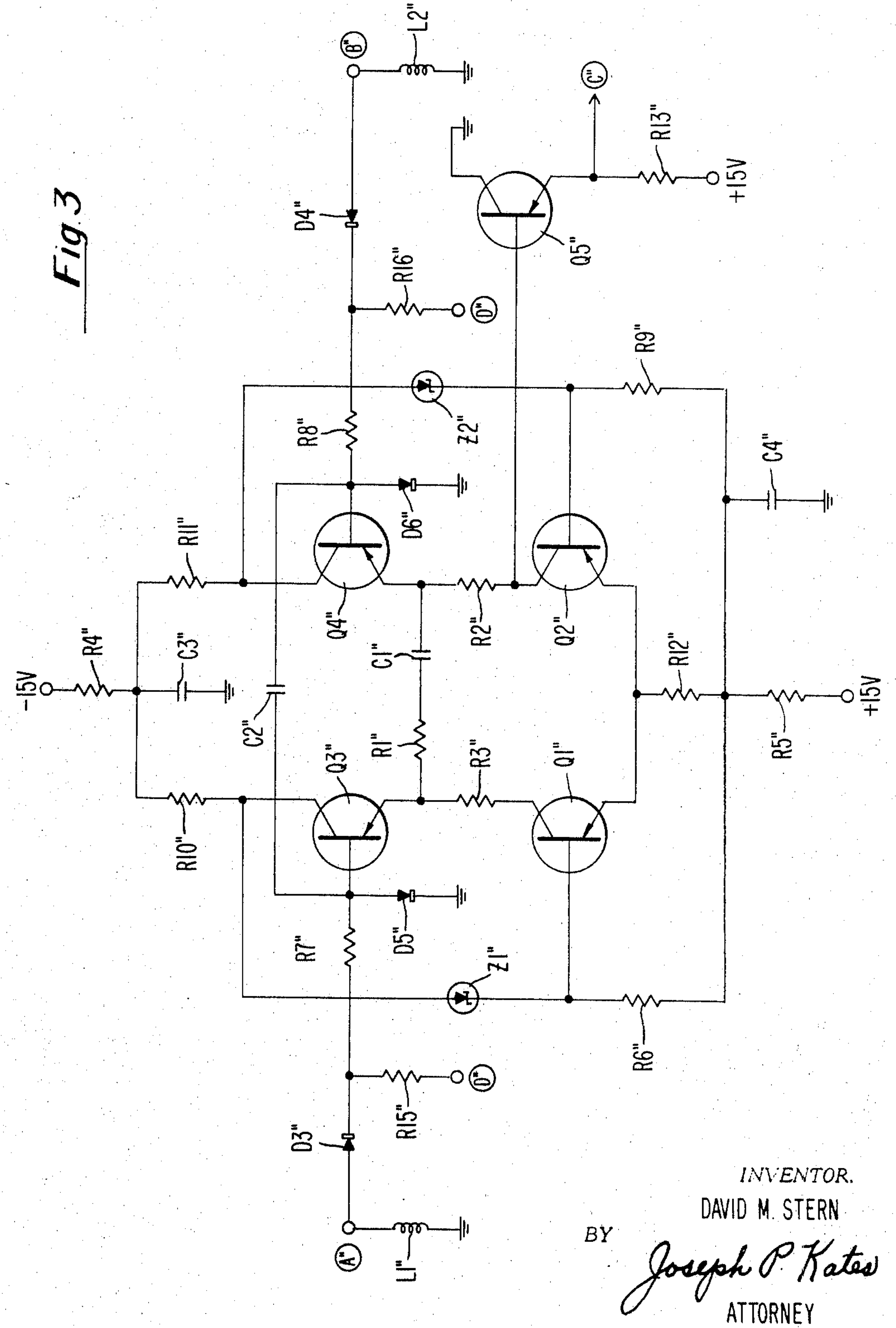
FIG. 3 is a schematic representation of the circuit of FIG. 1 but incorporating additional circuitry in a second preferred embodiment of the invention to provide the features of minimizing the effects of large writing transients when the amplifier is used, for example, in a read-write memory application.

Now refer to FIG. 3. This circuit is similar to that of FIG. 1 but incorporates means to minimize effects of large writing transients where the circuit is used in apparatus such as that involving read-write of memory. The FIG. 3 circuit also incorporates means to provide protection against excessive input voltages or currents which could occur under certain operating conditions.

Similar to the corresponding numbered (without superscript) components of FIG. 1, in the FIG. 3 embodiment, transistors Q1″, Q2″, Q3″, Q4″, and Q5″; Zener diodes Z1″ and Z2″; resistors R1″, R2″, R3″, R4″, R5″, R6‴, R9″, R10″, R11″, R12″, and R13″; capacitors C1″, C2″, C3″, and C4″; signal sources L1″ and L2″. Signal input terminals A″ and B″ and power supply sources of +15 volts and −15 volts are provided. These components and their purpose, or function and operation are identical to that of the FIG. 1 embodiment. Hence, to avoid redundant and unnecessary explanation, the structure and operation of these components will not be repeated in the description of FIG. 3 and the explanation of FIG. 1 is referred to for this purpose.

Variations and options in the illustrative embodiments within the framework of the invention herein described are illustrated by the FIG. 3 embodiment and these are now further described in detail.

A first and a second current and voltage limiting resistsor R7″ and R8″ and a first and a second diode D5″ and D6′ are provided. One end of resistor R7″ is connected to the base of transistor Q3″. One end of resistor R8″ is connected to the base pf of transistor Q4″. The anode of diode D5″ is connected to the junction of the base of transistor Q3″ and the end of resistor R7″ connected to the transistor Q3″ base. The anode of diode D6″ is connected to the junction of the base of transistor Q4″ and the end of resistor R8″ connected to the transistor Q4″ base. The cathodes of diodes D5″ and D6″ are grounded. Within the framework of this invention components similar to the resistor R7″ and diode D5″ components in the transistor Q3″ circuit and the resistor R8″ and diode D6″ components in the transistor Q4″ circuit optionally may be provided correspondingly in the transistor Q3 and Q4 circuits of FIG. 1, when the circuit is to be employed as a sense amplifier, and where it may be desirable to give protection against excessive voltages or currents which could occur under certain conditions. However resistor R7″ and diode D5″ (and resistor R8″ and diode D6″) are required for use in circuits such as that of FIG. 3 where write transients should be minimized.

Further provided are a second pair of blocking diodes D3″ and D4″. Blocking diodes D3″ and D4″ further comprise the circuit means to minimize transients. Diodes D3″ and D4″ also provide appropriate blocking when the circuit is used in applications requiring head switching of heads with split windings. In such last-mentioned applications of the invention the input signals are obtained from spilt winding heads such as may be employed with magnetic drums or tapes, for example. It will be understood that, where used with split winding heads, the input signal sources L1″ and L2″ together may form a composite split winding and a similar composite winding may be provided for each head (not shown). In such a split winding head the half windings (not shown) will correspond to signal sources L1″ and L2″ and the half windings may be connected in series. The junction between the half windings may be connected to the fixed pivotable end of a contact arm of a single pole, double throw switch means (not shown) which switches between a terminal connected to a source of negative voltage (not shown) and a terminal connected to ground which will be provided for each head. The junction between the half windings of each additional head or heads with split windings are connected to the fixed pivotable end or ends of a similar switching contact or contacts (not shown). The free end of each contact may switch between terminals (not shown) connected to a negative voltage and to ground which will be provided. For each split winding head a pair of diodes (not shown) similar to diodes D3″ and D4″ will be provided. The anodes of each such diode will be connected to one of the half windings at its winding end opposite the switch contact connected end. The cathodes of all blocking diodes of the transistor Q3″ input circuit and corresponding to diode D3″ will be connected together. The cathodes of all diodes of the transistor Q4 input circuit and corresponding to diode D4″ also will be connected together. That is each pair of half windings corresponding to signal sources L1″ and L2″ together will form a split winding, but instead of grounding the ends opposite the transistor input connected ends as shown in FIG. 3, these ends will be joined. The junction will be connected to the common terminal of a switching means to switch between negative voltage source and ground terminals provided. For example, the movable side of a contact arm may be provided appropriately to be connectable to the terminals by switching therebetween. The junction of the cathodes of the diodes corresponding to diode D3″ will be connected to the end of resistor R7″ opposite its transistor Q3″ base connected end. The junction of the cathodes of the diodes corresponding to diode D4″ will be connected to the ends of the resistor R8″ opposite its transistor Q4″ connected end.

In the FIG. 3 embodiment as shown the anode of diode D3″ is connected to input signal terminal A and its cathode is connected to the end of resistor R7″ opposite the latter's transistor Q3″ base connected end. The anode of diode D4″ is connected to input signal terminal B and its cathode is connected to he end of resisor R8″ opposite the latter's transistor Q4″ base connected end.

A pair of current source resistors R15″ and R16″ and a pair of transient minimizing signal voltage source terminals D″ are provided. The minimizing signal voltage may be of magnitude and timed such that a voltage for example of minus three volts (−3 v.) appears at terminals D″ when writing is not being effected and when writing is being effected a voltage of plus six volts (+6 v.) is applied at terminals D″ for the duration of the writing cycle.

One end of resistor R15″ is connected to the junction of the cathode of diode D3″ and resistor R7″. One end of resistor R8″ is connected to the junction of the cathode of diode D4″ and resistor R8″. The other ends of resistors R7″ and R8″ are connected to minimizing signal voltage source terminals D″.

OPERATION

The operation of the FIG. 1 circuit has been described in detail. As stated to avoid redundancy the operation of the corresponding portions of the circuit of FIG. 3 are not described. The other features of the invention brought out in FIG. 3 are described now.

During the time that a write signal is applied at the memory devices L1″ or L2″ a positive going signal which brackets the writing time interval is applied at the writing noise minimizing input signal terminals D″. This signal may be generated in the shape of a square wave, for example. Generation of the required minimizing signal appearing at terminals D″ may be effected by ways conventional to the art. For example, the write noise minimizing input signal may be generated by a delay multivibrator to provide a waveform of the proper shape and a buffer to provide the appropriate voltage levels required. Such circuits to generate a signal which is appropriately timed and which will last for the duration of the writing cycle are conventional and further description need not be made herein. Upon applying the signal at the writing noise minimizing input signal source terminals D″, the diodes D5″ and D6″ are forward biased providing known and approximately equal signals at the bases of transistors Q3″ and Q4″. That is, a positive pulse applied at terminal D″ causes a positive voltage to appear at the anode of diode D5″ which causes current flow in the forward biased direction across the diode D5″ and a corresponding positive voltage to appear at the base of transistor Q3″. Because the cathodes of the diodes D5″ and D6″ are referenced to ground the known approximately equal positive voltage is applied at the bases of transistors Q3″ and Q4″. The amplitude of the signal applied at terminals D″ is chosen to be large enough so that the voltages appearing at the junctions of the cathode of diode D3″ and the resistor R15″ and at the cathode of diode D4″ and the resistor R16″, respectively, are each large enough to reverse bias the respective diodes D3″ and D4″ for all writing transients which may at that time be present at the signal input terminals A″ and/or B″. By reverse biasing the diodes D3″ and D4″ the writing transients are thereby isolated from the amplifying elements of the differential amplifier. By this means the uncertain and unbalanced signals which may appear at points A″ and B″ are substituted by the balanced and low-level input signals appearing across diodes D5″ and D6″.

The fact that the known substituted voltages are approximately equal is significant because the gain of he amplifier is a differential gain operating on the differences between the input signals at signal input terminals A″ and B″. The gain for signals of equal phase and amplitude at the bases of transistors Q3″ and Q4″ is very low due to the negative feedback paths provided by the Zener diodes Z1″ and Z2″ and the lack of signal coupling when the two signals are equal between the emitters of stages Q3″ and Q4″. While not to be construed as limiting the invenion in one practical embodiment, the writing noise minimizing signal voltage applied at terminals D″ was −3 volts when sensing without writing is being effected by the circuit and a voltage of +6 volts applied for the duration of the writing cycle at terminals D″ when writing is being effected.

At times when a negative voltage such as −3 volts is imparted at terminals D″, when writing is not being effected, the diodes D3″ and D4″ are forward biased by virtue of the current flow through resistors R15″ and R16. With the diodes D3″ and D4″ forward biased their anodes are essentially at ground because of the low D.C. impedance of the elements L1″ and L2″.

The circuit embodying the invention such as illustrated by FIGS. 1 and 3 and as described herein, may be constructed utilizing NPN transistors for stages Q1, Q2, Q3, Q4 and Q5. Where stages Q1–Q5 are NPN transistors the (+15 and −15 volt) power supply sources are interchanged and the Zener diodes Z1 and Z2 are connected in the reverse polarity to that shown in FIG. 1.

Although not to be construed as in any way limiting the invention but presented only by way of example, practical examples of the illustrative preferred embodiments of the invention may use the following components:

| Part | | |
|---|---|---|
| Fig. 1 | Fig. 3 | Value or Designation |
| Transistors: | | |
| Q1, Q2, Q3, Q4 | Q1″, Q2″, Q3″, Q4″ | 2N711. |
| Q5 | Q5″ | 2N711 or 2N404. |
| Zener Diodes, Z1 and Z2 | Z1″ and Z2″ | 1/4 M1525. |
| Diodes, D5 and D6 (if provided) | D3″, D4″, D5″ and D6″ | T6-G (Transitron) or 1N4381. |
| Resistors: | | |
| R1 | R1″ | 47 ohms. |
| R2 | R2″ | 3,000 ohms. |
| R3 | R3″ | Do. |
| R4 | R4″ | 2,200 ohms. |
| R5 | R5″ | 750 ohms. |
| R6 | R6″ | 33,000 ohms. |
| R7 (if provided) | R7″ | 330 ohms. |
| R8 (if provided) | R8″ | Do. |
| R9 | R9″ | 33,000 ohms. |
| R10 | R10″ | 4,700 ohms. |
| R11 | R11″ | Do. |
| R12 | R12″ | 2,200 ohms. |
| R13 | R13″ | 1,800 ohms. |
| | R15″ | 20,000 ohms. |
| | R16″ | 18,000 ohms. |
| Capacitors: | | |
| C1 | C1″ | 2 microfarads (μf.). |
| C2 | C2″ | 470 micromicrofarads (μμf.). |
| C3 | C3″ | 25 microfarads (μf.). |
| C4 | C4″ | Do. |

It will be understood of course that many variations are possible in the light of the above teachings without departing from the spirit and scope of the invention described herein. For example, A.C. coupling R1, C1 could be other types of impedances or filters, not necessarily an R.C. series circuit. Many circuit changes within the scope of the invention are also readily apparent. It is accordingly intended, in the appended claims, to cover all such variations as fall within the true spirit of the invention.

What is claimed is:

1. A gain stabilized differential amplifier comprising (a) first and second pairs of unilateral electric current flow devices each device comprising a first input signal receiving element, a second and third element, the devices of each of the said pairs being connected in cascode-like connection wherein the second element of one of said devices of a given pair of devices is coupled to the third element of the other of said devices of said given pair, (b) means to apply a difference input signal to each of said input signal receiving elements of a first device in each of said first and second pairs of devices, (c) means responsive to said input signals and coupled in a circuit path between the second and third elements of said first device in said pairs of devices to feed voltage to said last mentioned third elements in a direction to reduce the D.C. effect of the input signals upon the last mentioned third elements and to reduce the D.C. effects of component variations, and (d) means to couple A.C. changes in voltage effected by said input signals at each said third element of said first device of said first pair of devices to said third element of said first device of said second pair of devices to thereby effect A.C. signal amplification.

2. A gain stabilized differential amplifier comprising (a) first and second pairs of unilateral electric current flow devices, said pairs comprising respectively a first and a third transistor connected in cascode-like connection and a second and a fourth transistor connected in cascode-like connection, (1) said first, second, third and fourth transistors each having a collector, a base and an emitter, (b) means to apply input signals to said differential amplifier comprising a source of input signals and means to couple said input signals to each of said bases of said first and second transistors, (c) means to feed voltage in a direction to reduce the D.C. effect of the input signals and of component variations comprising (1) a first and a second Zener diode, (2) means to connect said first Zener diode in a circuit path between the collector and emitter of said first transistor, and (3) means to connect said second Zener diode in a circuit path between the collector and emitter of said second transistor, (d) one of said circuit paths comprising the path from the collector of said first transistor to the base of said third transistor to the collector of said last mentioned transistor which in said cascode-like connection is connected to the emitter of said first transistor, and the other of said circuit paths comprising the path from the collector of said second transistor to the base of said fourth transistor to the collector of said last mentioned transistor which in said cascode-like connection is connected to the emitter of said second transistor, (e) means to couple A.C. changes effected by said input signals to said first and second transistors comprising a first resistor and a capacitor in series connected between the emitters of said first and second transistors, and (f) means for providing a constant source of current and means to connect said constant source of current to said third and fourth transistors.

3. The gain stabilized differential amplifier of claim 2 and further comprising:

(a) a second resistor of predetermined resistance relative to the resistance of said first resistor and wherein the ratio of resistance of said second resistor to the resistance of said first resistor is the predeterminedly desired amplifier gain, (b) means to connect said second resistor between said fourth transistor collector and said second transistor cascode-like connected emitter, (c) means to connect together the emitters of said third and fourth transistors, (d) a first voltage source, (e) a second voltage source, (f) means to connect said second voltage source to said first and second transistors, (g) said constant source of current comprising a third resistor, (h) said means to connect said constant source of current to said third and fourth transistors comprising means to connect said third resistor between said first voltage source and said emitters of said third and fourth transistors to thereby fractionate current flow between said third and said fourth transistors from said first voltage source to said second voltage source.

4. The gain stabilized amplifier of claim 3 including, (a) a fifth transistor connected as an emitter follower and having a collector, an emitter and a base, (b) means to couple the base of said fifth transistor to the collector of said fourth transistor, (c) said second source of voltage being of opposite polarity to said first source, (d) a fourth, a fifth, and a sixth resistor, (e) means to connect said fourth resistor to the collector of said first transistor, (f) means to connect said fifth resistor to the collector of said second transistor, (g) means to connect to each other the ends of the fourth and fifth resistors opposite their first and second transistor collector connected ends, (h) means to connect said sixth resistor between said second voltage source and the junction of said fourth and fifth resistors, (i) a second capacitor, (j) means to connect said second capacitor between the collectors of said first and second transistors to effect suppression of high frequency noise, (k) a seventh resistor, (l) means to couple said seventh resistor between said collector of said third transistor and said emitter of said first transistor, and wherein, (m) said first and second transistors comprise a first substantially balanced pair and said third and fourth transistors comprise a second substantially balanced pair, and (n) said fourth resistor is at least of the order of 1,000 ohms and said first resistor is at least of the order of one ohm.

5. A gain stabilized differential amplifier comprising (a) a first and a second substantially unidirectional electric current flow device, each having a first element to receive input signals, a second element and a third element, (b) means to apply difference input signals to said first input signal receiving element of each of said unidirectional current flow devices, (c) means to couple negative D.C. feedback from each of said second elements to each of said third elements of said unidirectional electric current flow devices such that upon application of said input signals the third element tends to follow the input signal voltage, (d) means to couple said third elements of said first and said second unidirectional electric current flow devices to provide positive A.C. feedback, (e) a third and a fourth unidirectional electric current flow device each having a said first, second and third element, (f) means to couple in cascode-like connection respectively said first and said second unidirectional electric current flow device third elements to said third and said fourth unidirectional electric current flow device corresponding second elements, (g) a first resistor, (h) a first voltage source, (i) means to connect together said third elements of said third and fourth unidirectional electric current flow devices to form a junction, (j) said first and third unidirectional electric current flow devices comprising a first path and said second and fourth unidirectional electric current flow devices comprising a second path, (k) means to connect said first resistor between said junction and said first voltage source whereby the circuit current is limited and fractionally divided between said first and second paths comprising said first and third and said second and fourth unidirectional electric current flow devices.

6. The gain stabilized differential amplifier of claim 5 wherein (a) said means to couple negative D.C. feedback includes a component of low impedance connected in a circuit path from each of said second elements to each of said third elements of said first and second unidirectional electric current flow devices.

7. The gain stabilized differential amplifier of claim 6 wherein (a) each said component of low impedance is a Zener diode connected respectively between said first and second unidirectional electric current flow device second elements and said third and fourth unidirectional electric current flow device first elements, said amplifier further including (b) a second source of voltage of polarity opposite to that of said first voltage source, (c) a second resistor, (d) means to couple said second resistor between said second voltage sources and the second elements of said first and second unidirectional electric current flow devices.

(e) a third resistor, (f) means to connect said third resistor between said second element of said third unidirectional electric current flow device and said third element of said first unidirectional electric current flow device, (g) a fourth resistor, (h) means to connect said fourth resistor between said second element of said fourth unidirectional electric current flow device and said third element of said second unidirectional electric current flow device, (i) said means to couple the third elements of said first and second unidirectional electric current flow devices to provide positive A.C. feedback comprising a fifth resistor, (j) means coupled to said fourth unidirectional electric current flow device to receive output therefrom, (k) said second resistor being of relatively large value, (l) the ratio of resistance values of said fourth to said fifth resistors being predetermined to provide a desired A.C. gain of said differential amplifier subsubstantially in accordance with said predetermined ratio.

8. A gain stabilized differential amplifier circuit comprising, (a) a first substantially balanced pair of transistor circuits comprising a first and a second transistor each having a base, a collector and an emitter, (b) a second substantially balanced pair of transistor circuits comprising a third and a fourth transistor each having a base, a collector and an emitter, (c) means to couple said third transistor to said first transistor and means to couple said second transistor to said fourth transistor in cascode-like connection wherein the collector of said third transistor is coupled to the emitter of said first transistor and the collector of said fourth transistor is coupled to the emitter of said second transistor,
(d) a first negative feedback means,
(e) means to couple said first negative feedback means between the collector of said first transistor and the base of said third transistor,
(f) a second negative feedback means,
(g) means to couple said second negative feedback means between the collector of said second transistor and the base of said fourth transistor,
(h) means to connect the emitters of said third and fourth transistors to form a junction,
(i) a substantially constant current source,
(j) means to connect said substantially constant current source to said junction of said third and fourth transistor emitters,
(k) means to apply difference signals to the bases of said first and second transistors,
(l) a first power supply source means to supply voltage to the collectors of said first and second transistors,
(m) said first substantially balanced pair of transistor circuits further comprising a first collector resistor,
(n) means to connect said first collector resistor between said power supply source and the collector of said first transistor,
(o) said means to couple said second transistor to said fourth transistor in cascode-like connection wherein the collector of said fourth transistor is coupled to the emitter of said second transistor further comprising a second resistor, and
(p) means to couple A.C. changes in voltage effected by said difference signals between the emitters of said first and second transistors.

9. The gain stabilized amplifier circuit of claim 8 wherein:
(a) said means to couple said third transistor to said first transistor in cascode-like connection wherein the collector of said third transistor is coupled to the emitter of said first transistor further comprises a third resistor,
(b) said means to couple A.C. changes in voltage effected by said difference signals between the emitters of said first and second transistors further comprises a fourth resistor,
(c) said first collector resistor is at least of the order of resistance of 1,000 ohms and said fourth resistor is at least of the order of resistance of one ohm.

10. The gain stabilized amplifier of claim 9 and further wherein:
(a) said second resistor is of resistance with respect to said fourth resistor resistance in a ratio subtantially equal to the desired amplification of the A.C. signal input of said difference signals applied to the bases of said first and second transistors.

11. The gain stabilized amplifier of claim 10 including,
(a) means to couple output from the collector of said fourth transistor,
(b) said third resistor is of resistance substantially equal to the resistance of said second resistor.

12. The gain stabilized amplifier of claim 9 including,
(a) means to couple output from the collector of said fourth transistor, and wherein
(b) said third resistor is of resistance substantially equal to the resistance of said second resistor,
(c) said substantially constant current source further comprises a fifth large resistor and a second power supply source means,
(d) said first and second negative feedback means each comprises a Zener diode.

13. The gain stabilized amplifier of claim 12 including (a) a sixth resistor connected between said fifth large resistor and said second power supply source and forming a junction with said fifth large resistor,
(b) a seventh large resistor connected between the base of said third transistor and said last-named junction of said fifth and sixth resistors to which said first negative feedback Zener diode form a first voltage level shifting circuit to establish a proper operating point at the first transistor base,
(c) an eighth large resistor connected between the base of said fourth transistor and said last-named junction of said fifth and sixth resistors to which said second negative feedback Zener diode form a second voltage level shifting circuit to establish a proper operating point at said second transistor base, and wherein,
(d) said first collector resistor and said second resistor resistances are each of the order of several thousand ohms and said fourth resistor is of resistance of the order of about one to fifty ohms.

14. The gain stabilized differential amplifier circuit of claim 9 including
(a) means to apply a controlled generated artificial common mode signal to the bases of said first and second transistors in such a manner as to eliminate and effectively replace the write transient signals which would otherwise appear on the bases of said last mentioned transistors during a write operation.
(b) said gain stabilized amplifier circuit thereby being adapted to read and write operations by reducing its sensitivity to overload write transients.

15. The gain stabilized amplifier circuit of claim 9 including
(a) means to provide a writing noise minimizng signal which brackets the writing time interval,
(b) a first and a second blocking diode,
(c) means to connect the anode of said first and second blocking diodes respectively to said means to apply difference signals to the bases of said first and second transistors,
(d) a fifth and a sixth current source resistor,
(e) means to connect one end of said fifth and sixth current source resistors to said means to provide noise minimizing signals,
(f) means to connect said fifth and sixth resistors respectively to the cathodes of said first and second blocking diodes,
(g) a seventh and an eighth current and voltage limiting resistor,
(h) a third and a fourth diode,
(i) means to connect the cathodes of said third and fourth diodes to ground,
(j) means to connect the anodes of said third and fourth diodes to the bases respectively of said first and second transistors,
(k) means to connect said seventh current and voltage limiting resistor between the cathode of said first blocking diode and the anode of said third diode,
(l) means to connect said eighth current and voltage limiting resistor between the cathode of said second blocking diode and the anode of said fourth diode,
(m) said gain stabilized amplifier circuit thereby being adapted for reading and writing operations.

References Cited

UNITED STATES PATENTS 3,280,347 10/1966 Blokker et al. ______ 330—30 X

ROY LAKE, Primary Examiner

LAWRENCE J. DAHL, Assistant Examiner

U.S. Cl. X.R.

330—26, 110